Nov. 8, 1966 D. LOHMAR 3,283,417
SELF-CORRECTING FACT CARD DEVICE
Filed Nov. 4, 1965
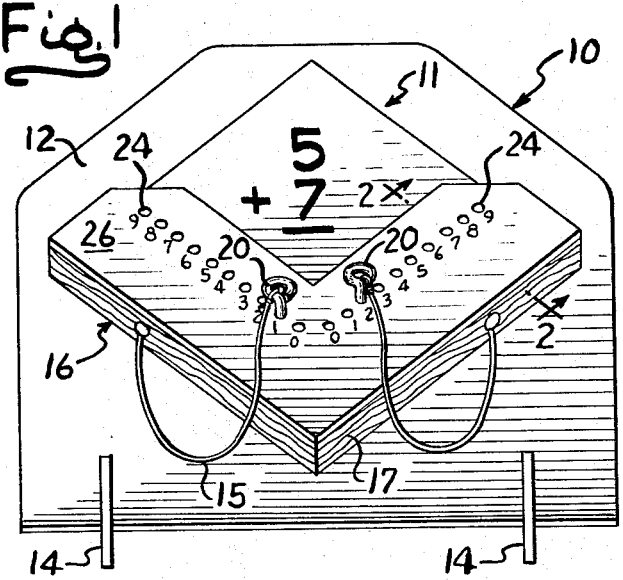
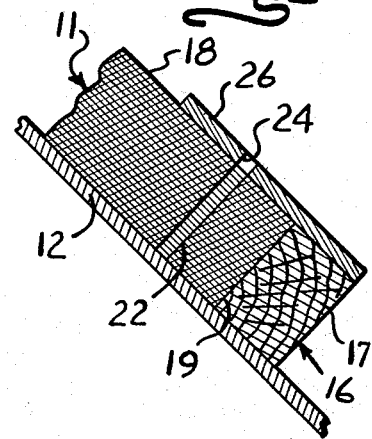
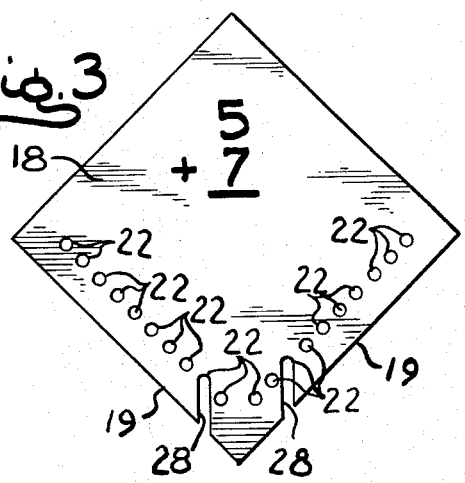
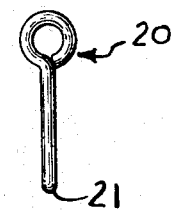
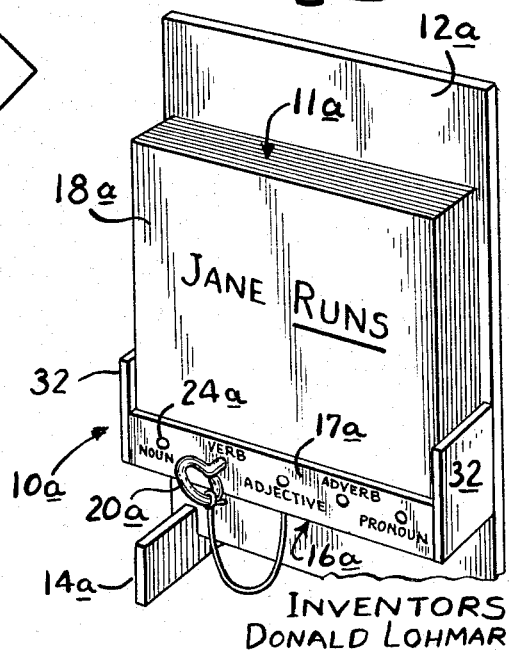
INVENTORS
DONALD LOHMAR
by: Wolfe, Hubbard, Voit & Osann
ATTYS.

United States Patent Office 3,283,417
Patented Nov. 8, 1966

3,283,417
SELF-CORRECTING FACT CARD DEVICE
Donald Lohmar, Galesburg, Ill., assignor to
Knox Educational Aids, Inc.
Filed Nov. 4, 1965, Ser. No. 506,318
2 Claims. (Cl. 35—9)

The present invention relates to a game-type teaching device, and more particularly to a flash-card system as a teaching device.

Teaching games previously have been constructed so that the child mentally associates the correct answer with a physical part of the game. This has the disadvantage of the lack of stress on the correct answer itself. Attempts to avoid this have often resulted in complicated and expensive devices.

Accordingly, it is an object of the invention to provide a simple teaching device in the nature of a flash-card game, wherein a series of related problems arise, each having a large number of answers to choose from.

It is another object to do this with a relatively inexpensive, simple, non-electrical device.

Other objects and advantages of the invention will become apparent upon reading the following detailed discussion and upon reference to the attached drawings, in which:

FIGURE 1 is a perspective of a game constructed according to the invention;

FIG. 2 is a fragmentary section taken approximately along the line 2—2 in FIG. 1;

FIG. 3 is a plan of a representative card showing some of the elements of the invention;

FIG. 4 is a perspective of an answer pin used in the invention; and

FIG. 5 is a fragmentary perspective showing another embodiment of the invention.

While the invention will be described in connection with certain preferred embodiments, it will be understood that I do not intend to limit the invention to those described.

Turning now to the drawings, FIG. 1 illustrates a flash-card game embodying my invention. Generally the game consists of a deck 11 of cards 18 held on a support 10 formed by a flat support surface 12 and a bracket 16 attached to the surface 12. This surface interlocks with two feet 14 to hold the game in an upright position. Each card 18 has a question or a problem indicated on its upper face, as shown in FIGS. 1 and 3, and the bracket 16 has two rows of possible "answers" indicated by a series of numbers running from 0 to 9. The left-hand row represents, in FIG. 1, the tens, while the right-hand row represents the units. Pins or pegs 20, used to indicate the answers, are attached to bracket 16 by string 15.

In accordance with the invention, each card 18 is provided with a series of ten holes 22 along each of the two bottom marginal edges 19 of the card. When the cards rest in the bracket in a plane parallel to the surface 12 with the edges 19 bearing against a portion 17 of the bracket, as shown in FIG. 2, the holes 22 are aligned with two rows of holes 24 corresponding to the indicated "answers" in a top plate 26 glued or otherwise fixed to portion 17 of the bracket 16, in an overlying fashion so that the bottom edges 19 are concealed. Thus, when the peg 20 is inserted through a hole 24 and holes 22 in cards 18, the cards may not be removed inasmuch as the end portion 21 of peg 20 (FIG. 4) rests on body 12 of the support.

However, as seen in FIG. 3, one of the holes in each row is not completely enclosed but joins a slot 28 cut inwardly from the edge of the card. The slot is shown as being vertical with parallel sides but may be of any shape, provided it is parallel with the slot 28 in the other row. The particular hole joined by the slot represents the correct answer in that row, in solving the problem appearing on the face of the card. When the card is the top card showing in the bracket 16, if pegs 20 are placed through the openings 24 which overlay holes 22 connected to slots 28, the top card can be removed by sliding it upwards by hand, as the slots allow the pegs to pass the card. But if one of the pegs is inserted into an opening 24 which is not positioned over a hole 22 connected with slot 28, the peg will retain the card.

In operating the game, the user reads the problem stated on the top card, decides on the answer, and picks the number in the left-hand row on plate 26 representing the tens' number, and the number in the right-hand row on plate 26 representing the units' number. By inserting the pegs in the holes 24 corresponding to these numbers, the user tests his answer by attempting to remove the top card. Only the correct hole 24 will be aligned with a hole 22 joined with a slot 28, so that only the correct choice of holes 24 will release the card. Thus, the card shown in FIGS. 1 and 3 will require the pegs to be placed in the left-hand "1" and the right-hand "2," to give the correct answer "12," as shown in FIG. 1, so that the card can slide out by means of the slots 28.

The game can be used primarily for teaching in that the mechanical act of choosing the answer reinforces the mental choice, and the correct response results in the "reward" of removing the problem so as to go on to the problem on the succeeding card in the deck 11. Furthermore, the sequence of the cards 18 in the deck 11 can be arranged logically, so that the game functions like a teaching machine. Thus the card following that shown in FIG. 1 could be "5+8".

The embodiment shown in FIGS. 1–3 is not limited only to problems of addition. Subtraction, multiplication, and division are additional exercises usable provided the answers range from 0 to 99. Separate decks can be used for each type of arithmetic operation, or the decks can be mixed together as desired.

In FIG. 5, an alternate embodiment of the invention is illustrated, with parts corresponding to those previously described having the same reference numerals to which a distinguishing suffix "a," has been added. Thus, a support 10a is partially shown in FIG. 5, body 12a having bracket 16a fixed thereto and holding a deck of cards 11a each of which has a row of holes along the bottom edge which are aligned with corresponding rows 24a and retained by a peg 20a.

In carrying out the invention, bracket 16 has been modified by removing one of the V legs and by rotating it so that it is horizontal. Side portions 32 are attached to prevent lateral motion of the cards 11a held in the bracket. The cards 18a used here do not show arithmetical problems, but rather problems in grammar. The physical structure of these cards is otherwise similar, using openings along one bottom edge only, and a slot connecting one of these openings representing the correct answer to the problem on the card.

Because the required answers are of a different type, it is necessary to have a different set of answers to correspond with openings 24a. Thus, parts of speech are shown on the front portion 17a of bracket 16a, from which one is chosen as the part of speech for the word underlined on the card.

This embodiment is not limited just to grammar problems. Colors can be taught by having a color shown on the card, and the names of the various colors printed along the front answer portion 17a of the bracket. It will also be appreciated by one skilled in the art, that spelling or phonics could be taught in a similar fashion.

In both of the illustrated embodiments, my invention will aid in reinforcing the mental steps used in solving problems, and will do so by a simple inexpensive device.

I claim as my invention:

1. A teaching device comprising in combination a stack of generally square cards of uniform size and shape having indicia on the faces thereof representing questions to be answered, a support means having a support surface for receiving said stack of cards, means attached to said support surface for engaging at least a pair of adjacent marginal edges of said cards but less than all of said edges to permit each of said cards to be slidably removed from said support means in a common direction parallel to said support surface, said engaging means having means for overlying and concealing said adjacent marginal edge portions on the face of the uppermost card in said stack, said overlying means having at least one series of holes therein and indicia associated with each hole representing a choice of answers to the questions on each of the cards in said stack, each of said cards having at least one series of holes formed in one of said marginal edge portions thereof, said pair of adjacent marginal edges of said cards cooperating with said engaging means so that the holes in said cards are aligned with the holes in said overlying means when said stack of cards is initially inserted in said support means, at least one of said holes in each of said series in each of said cards having a slot joining said aligned hole representing the correct answer to the question on said card, said slot extending from said hole to the adjacent edge of said card and parallel to the common direction of sliding of said cards, and pin means for insertion into said aligned holes for selecting answers and permitting removal of a card from said stack after insertion of said pin means, only when said pin means is inserted in a hole in said series of holes having a slot associated therewith.

2. The teaching device defined in claim 1 in which said means for engaging a plurality of marginal edges of said cards is means engaging two adjacent edges of said cards, said overlying means having two series of holes therein, one series for each of said two adjacent marginal edges, one hole in each of said two series of holes comprising a part of the answer to the questions on each of the cards, and said pin means including a first pin means for insertion into a hole of one of said series for selecting part of the answer to the question on a card and a second pin means for insertion into a hole of the other of said series for selecting the remainder of the answer to the question on said card.

References Cited by the Examiner

UNITED STATES PATENTS

| | | | |
|---|---|---|---|
| 2,213,411 | 9/1940 | Rippon | 39—9 |
| 2,311,055 | 2/1943 | Kopas | 35—9 X |
| 2,838,847 | 6/1958 | Zalkind | 35—9 |
| 3,166,858 | 1/1965 | Huetten | 35—9 |
| 3,201,875 | 8/1965 | Porteus et al. | 35—9 X |

EUGENE R. CAPOZIO, *Primary Examiner.*

S. M. BENDER, *Assistant Examiner.*